United States Patent
Shimazu et al.

(10) Patent No.: US 11,906,803 B2
(45) Date of Patent: Feb. 20, 2024

(54) OPTICAL FIBER RIBBON WITH INTERMITTENTLY COUPLED GROUPS OF FIBERS

(71) Applicants: SUMITOMO ELECTRIC INDUSTRIES, LTD., Osaka (JP); SUMITOMO ELECTRIC OPTIFRONTIER CO., LTD., Yokohama (JP)

(72) Inventors: Takayuki Shimazu, Osaka (JP); Kenichiro Otsuka, Osaka (JP); Yuuki Shimoda, Osaka (JP); Shinji Yamane, Yokohama (JP)

(73) Assignees: SUMITOMO ELECTRIC INDUSTRIES, LTD., Osaka (JP); Sumitomo Electric Optifrontier Co., Ltd., Yokohama (JP)

( * ) Notice: Subject to any disclaimer, the term of this patent is extended or adjusted under 35 U.S.C. 154(b) by 0 days.

(21) Appl. No.: 17/826,727

(22) Filed: May 27, 2022

(65) Prior Publication Data
US 2022/0382007 A1 Dec. 1, 2022

(30) Foreign Application Priority Data
May 31, 2021 (JP) .................. 2021-091385

(51) Int. Cl.
*G02B 6/44* (2006.01)
(52) U.S. Cl.
CPC .......... *G02B 6/4404* (2013.01); *G02B 6/4403* (2013.01)

(58) Field of Classification Search
CPC ................................. G02B 6/4404
See application file for complete search history.

(56) References Cited

U.S. PATENT DOCUMENTS

| | | | |
|---|---|---|---|
| 4,900,126 A | 2/1990 | Jackson et al. | |
| 5,717,805 A * | 2/1998 | Stulpin | G02B 6/4404 385/114 |
| 6,337,941 B1 * | 1/2002 | Yang | G02B 6/448 385/100 |
| 2005/0271342 A1 * | 12/2005 | Tanaka | G02B 6/448 385/134 |
| 2010/0296781 A1 * | 11/2010 | Sato | G02B 6/4495 83/13 |

(Continued)

FOREIGN PATENT DOCUMENTS

| | | |
|---|---|---|
| JP | H02-47606 A | 2/1990 |
| JP | 2009-93077 A * | 4/2009 |
| JP | 2014-211526 A * | 11/2014 |

*Primary Examiner* — Michael Stahl
(74) *Attorney, Agent, or Firm* — Faegre Drinker Biddle & Reath LLP

(57) ABSTRACT

An optical fiber ribbon includes a plurality of optical fiber cores arranged in parallel in a direction orthogonal to a longitudinal direction of the optical fiber cores, and a coupling member configured to couple the plurality of optical fiber cores. In the optical fiber ribbon, a plurality of coupled sections and a plurality of separate sections are alternately provided in the longitudinal direction. Each of the plurality of coupled sections is in a state in which all of the adjacent optical fiber cores are coupled by the coupling member. Each of the plurality of separate sections is in a state in which at least two of the optical fiber cores adjacent to each other are not coupled by the coupling member.

9 Claims, 9 Drawing Sheets

(56) References Cited

U.S. PATENT DOCUMENTS

| | | | |
|---|---|---|---|
| 2016/0097909 A1* | 4/2016 | Loeffelholz | G02B 6/46 385/134 |
| 2017/0219790 A1* | 8/2017 | Debban | G02B 6/4403 |
| 2019/0235173 A1* | 8/2019 | Sato | G02B 6/3803 |
| 2020/0064550 A1* | 2/2020 | Sato | G02B 6/443 |
| 2020/0064574 A1* | 2/2020 | Fallahmohammadi | G02B 6/448 |
| 2020/0150368 A1* | 5/2020 | Sato | G02B 6/4404 |
| 2021/0018705 A1* | 1/2021 | Sahoo | G02B 6/448 |
| 2022/0196944 A1* | 6/2022 | Fallahmohammadi | G02B 6/448 |
| 2022/0196945 A1* | 6/2022 | Sato | G02B 6/448 |
| 2022/0196946 A1* | 6/2022 | Fallahmohammadi | G02B 6/4403 |
| 2022/0317375 A1* | 10/2022 | Kaneko | G02B 6/2555 |
| 2022/0317400 A1* | 10/2022 | Chalk | G02B 6/4403 |

\* cited by examiner

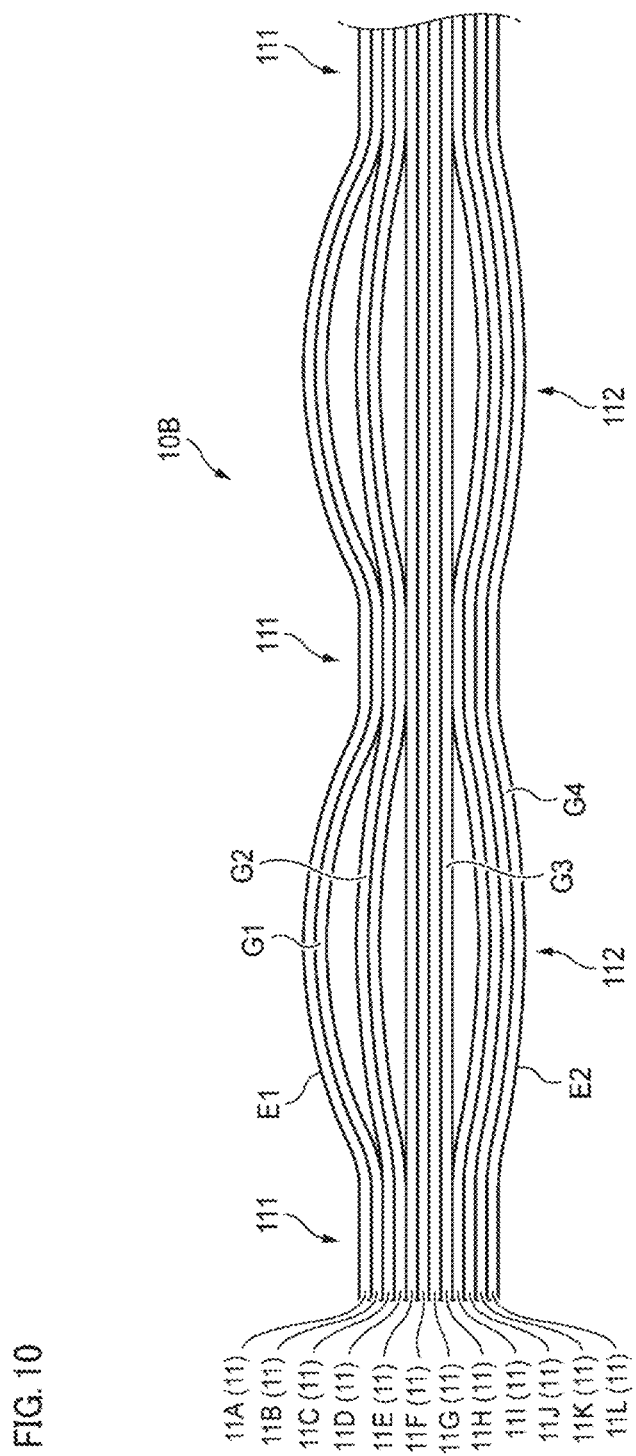

OPTICAL FIBER RIBBON WITH INTERMITTENTLY COUPLED GROUPS OF FIBERS

CROSS REFERENCE TO RELATED APPLICATIONS

This application claims priority based on Japanese Patent Application No. 2021-091385 filed on May 31, 2021, and the entire contents of which are incorporated herein by reference.

BACKGROUND

The present disclosure relates to an optical fiber ribbon. JP-A-H02-47606 discloses an optical fiber ribbon having a plurality of optical fiber cores arranged in parallel and an adhesive for filling a gap between adjacent optical fiber cores.

SUMMARY

An optical fiber ribbon according to an embodiment of the present disclosure includes a plurality of optical fiber cores arranged in parallel in a direction orthogonal to a longitudinal direction, and a coupling member configured to couple the plurality of the optical fiber cores. In the optical fiber ribbon, a plurality of coupled sections and a plurality of separate sections are alternately provided in the longitudinal direction of the optical fiber cores. Each of the plurality of coupled sections is in a state in which all adjacent optical fiber cores of the plurality of the optical fiber cores are coupled by the coupling member. Each of the plurality of separate sections is in a state in which some adjacent optical fiber cores of the plurality of the optical fiber cores are not coupled by the coupling member.

BRIEF DESCRIPTION OF THE DRAWINGS

FIG. 10 is a diagram illustrating another example of a structure of an optical fiber ribbon.

DETAILED DESCRIPTION

Figure 1:
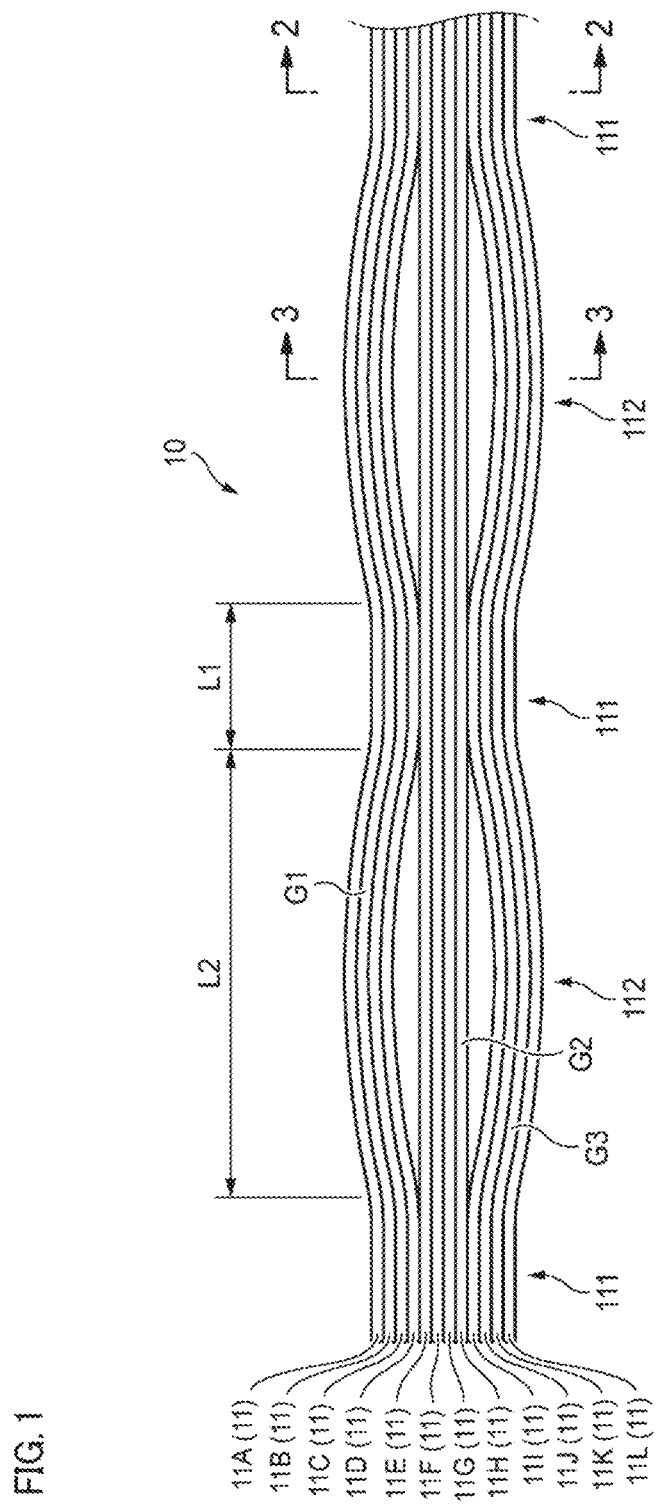
FIG. 1 is a diagram illustrating an example of a structure of an optical fiber ribbon according to an embodiment of the present disclosure.

In the optical fiber ribbon disclosed in JP-A-H02-47606, adjacent optical fiber cores of a plurality of optical fiber cores are coupled to each other, and thus the plurality of the optical fiber cores is collectively handled. On the other hand, when the optical fiber ribbon is connected to another optical fiber core using a fusion splicer having grooves with an arrangement pitch different from an arrangement pitch of the optical fiber cores, it is necessary to convert the arrangement pitch of the optical fiber cores.

It is an object of the present disclosure to provide an optical fiber ribbon with improved connection workability while maintaining the ease of handling.

First, the contents of embodiments of the present disclosure will be listed and described.

(1) An optical fiber ribbon according to the present disclosure includes a plurality of optical fiber cores arranged in parallel in a direction orthogonal to a longitudinal direction of the optical fiber cores, and a coupling member configured to couple the plurality of optical fiber cores. In the optical fiber ribbon, a plurality of coupled sections and a plurality of separate sections are alternately provided in the longitudinal direction. Each of the plurality of coupled sections is in a state in which all of the adjacent optical fiber cores are coupled by the coupling member. Each of the plurality of separate sections is in a state in which at least two of the optical fiber cores adjacent to each other are not coupled by the coupling member.

According to the configuration described above, since the coupled section in which all of the optical fiber cores are coupled is provided, the plurality of optical fiber cores is collectively handled. On the other hand, the separate section is provided in which adjacent optical fiber cores are not coupled to each other. This may widen a spacing between adjacent optical fiber cores that are not coupled to each other, and thus increase a width in an arrangement direction of the entire optical fiber cores that constitute the optical fiber ribbon. For example, when an existing fusion splicer having grooves with an arrangement pitch different from that of optical fiber cores is used to splice an optical fiber ribbon to another optical fiber core, the width in the arrangement direction of the entire optical fiber cores may be increased to match the arrangement pitch of the grooves of the existing fusion splicer. Therefore, a connection workability of an optical fiber ribbon is improved while maintaining the ease of handling.

(2) In the separate sections, the plurality of optical fiber cores may be divided into a plurality of groups each including at least two optical fiber cores. In the groups, the optical fiber cores adjacent to each other may be coupled to each other in a state of being in contact with each other. The groups adjacent to each other may not be coupled to each other.

According to the above configuration, since the plurality of optical fiber cores is collectively handled for each group in the separate sections, connection workability is improved.

(3) The plurality of optical fiber cores may include 12 optical fiber cores. In the separate sections, the plurality of optical fiber cores may be divided into three groups.

According to the above configuration, it is easy to adapt the optical fiber cores constituting the optical fiber ribbon to an arrangement pitch of grooves of an existing pitch conversion holder or an existing fusion splicer.

(4) The plurality of optical fiber cores may include 16 optical fiber cores. In the separate sections, the plurality of optical fiber cores may be divided into four groups.

According to the above configuration, it is easy to adapt the optical fiber cores constituting the optical fiber ribbon to an arrangement pitch of grooves of an existing pitch conversion holder or an existing fusion splicer.

(5) A length of each of the coupled sections in the longitudinal direction may be 5 mm to 50 mm.

According to the above configuration, since a length of each of the coupled sections is 5 mm or more, even when the optical fiber ribbon is shocked by vibration, the coupling member is less likely to be separated from the optical fiber cores. On the other hand, since a length of each of the coupled sections is 50 mm or less, for example, when a coupled section is cut off and a separate section is set in a pitch conversion holder, it is possible to suppress an occurrence of waste in which the coupled section is cut long to be removed.

(6) A length of each of the separate sections in the longitudinal direction may be 20 mm to 100 mm.

According to the above configuration, since a length of each of the separate sections is 20 mm or more, it is easy to set a separate section in a pitch conversion holder. On the other hand, since a length of the separate sections is 100 mm or less, it is easy to maintain an arrangement state without causing the optical fiber cores to be largely separated from each other.

(7) An outer diameter of each of the optical fiber cores may be 200 μm or less.

According to the above configuration, generally, an arrangement pitch of grooves of an existing fusion splicer is 250 μm. On the other hand, an outer diameter of each of the optical fiber cores in the optical fiber ribbon is 200 μm or less. However, by widening a spacing between adjacent optical fiber cores that are not coupled, the optical fiber cores of the optical fiber ribbon may be adapted to the arrangement pitch of the grooves of the existing fusion splicer.

(8) In the separate sections, the number of optical fiber cores to which an optical fiber core located at a first end of the optical fiber ribbon in an arrangement direction of the optical fiber cores orthogonal to the longitudinal direction is coupled may differ from the number of optical fiber cores to which an optical fiber core located at a second end of the optical fiber ribbon in the arrangement direction of the optical fiber cores is coupled.

According to the above-described configuration, since coupling states of the optical fiber cores at both ends of the optical fiber ribbon are different, each of the optical fiber cores may be identified. In particular, even when each of the optical fiber cores is not colored for identification, or even when each of the optical fiber core is colored for identification but too difficult to see, each of the optical fiber cores may be identified based on an arrangement position of each of the optical fiber cores.

Hereinafter, embodiments according to the present disclosure will be described in detail with reference to the drawings. In the description of the drawings, the same or corresponding elements are denoted by the same reference numerals, and duplicate description thereof will be omitted. Dimensions of members illustrated in the drawings may be different from actual dimensions of the members for convenience of description. In addition, the dimensions of each member illustrated in the drawings may be different from each other between the drawings for convenience of description.

Figure 2:
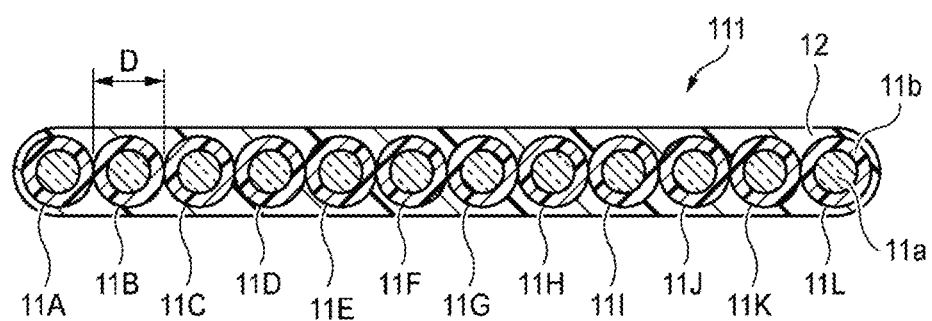
FIG. 2 is a cross-sectional view taken along line 2-2 in FIG. 1.
Figure 3:
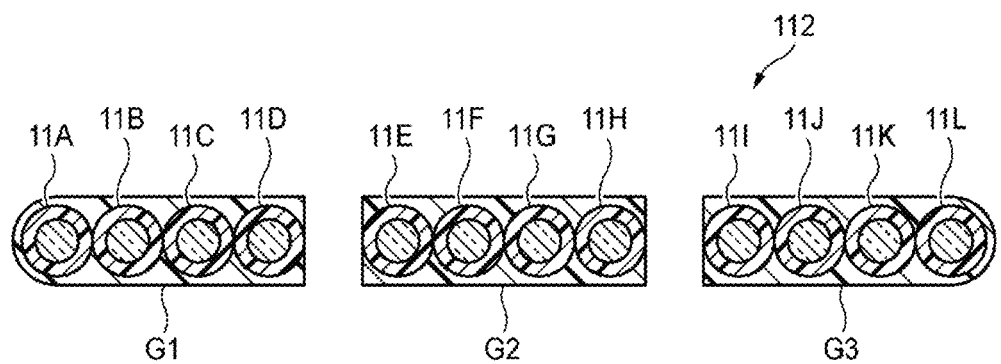
FIG. 3 is a cross-sectional view taken along line 3-3 in FIG. 1.
Figure 4:
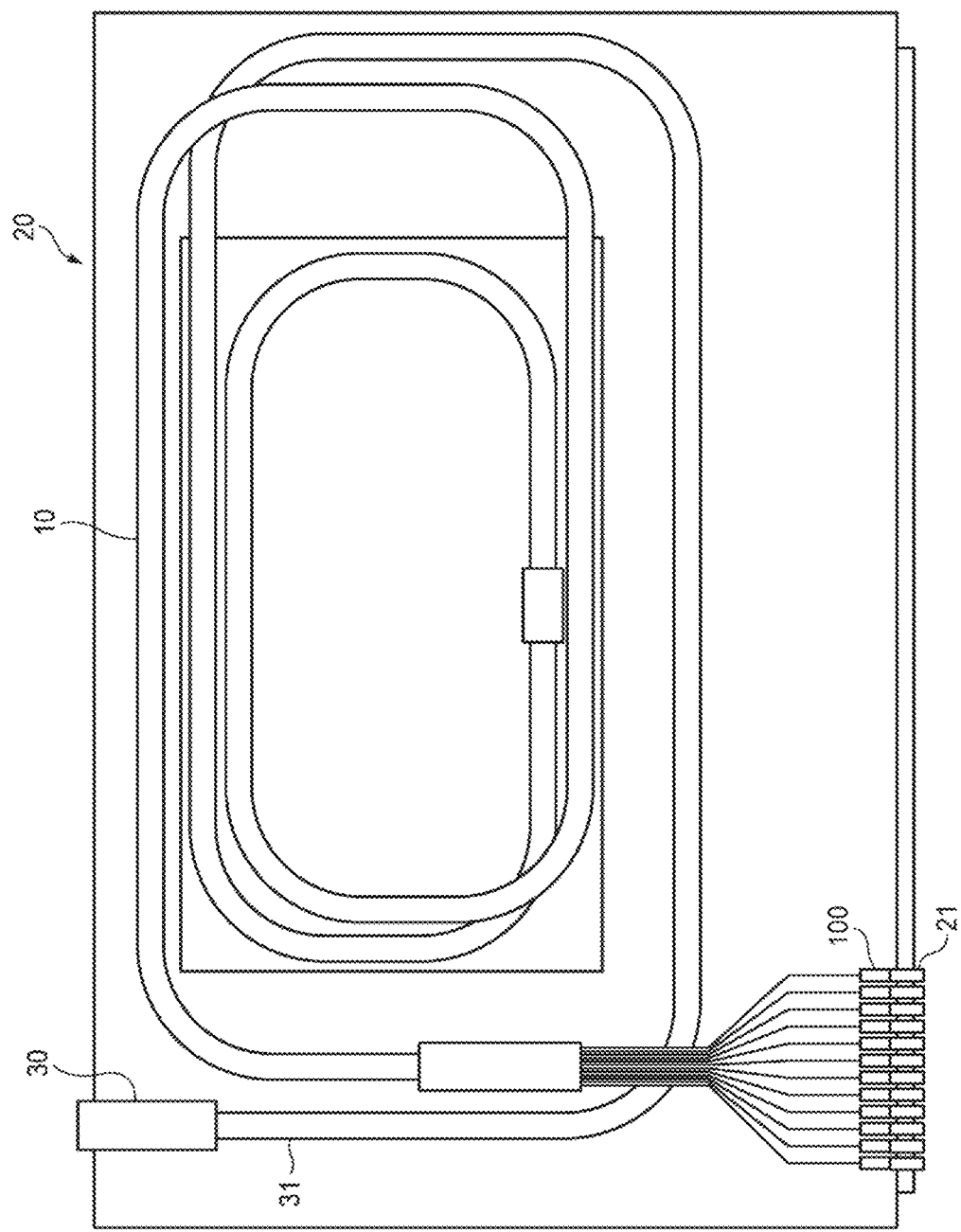
FIG. 4 is a schematic diagram illustrating an optical wiring box in which the optical fiber ribbon in FIG. 1 is disposed.

FIGS. 1 to 3 are diagrams illustrating configuration examples of an optical fiber ribbon 10 according to the present embodiment. As illustrated in FIG. 4, for example, the optical fiber ribbon 10 is used as an optical fiber ribbon disposed inside an optical junction box 20 housed in a rack disposed in a data center or the like. In optical junction box 20, one end of the optical fiber ribbon 10 is connected to an adapter 21 of optical junction box through, for example, a connector 100. The other end of the optical fiber ribbon 10 is fusion spliced to an optical fiber ribbon 31 of an optical fiber cable 30 introduced into optical junction box 20.

As illustrated in FIG. 1, the optical fiber ribbon 10 includes a plurality of the optical fiber cores 11. The plurality of the optical fiber cores 11 are arranged in parallel in a direction orthogonal to a longitudinal direction of the optical fiber cores 11. In this embodiment, twelve optical fiber cores 11A to 11L are arranged in parallel in a state where adjacent optical fiber cores 11 are in contact with each other. As illustrated in FIG. 2, each of the optical fiber cores 11 includes a glass fiber 11a and a coating resin 11b formed around a glass fiber 11a. The glass fiber 11a is, for example, a fiber whose main component is a glass such as quartz. The coating resin 11b is, for example, an ultraviolet curing resin or the like. The coating resin 11b may be formed of two or more layers of resins, and an outermost layer may be colored. The optical fiber core 11 has an outer diameter D of 200 μm, for example.

The optical fiber ribbon 10 includes a coupling member 12. The coupling member 12 is configured to couple the plurality of the optical fiber cores 11. In this embodiment, the coupling member 12 is formed so as to cover a periphery of the plurality of the optical fiber cores 11. The coupling member 12 is, for example, a coating resin made of an ultraviolet curing resin, a thermosetting resin, or the like.

As illustrated in FIG. 1, the optical fiber ribbon 10 has a plurality of coupled sections 111 and a plurality of separate sections 112. The coupled sections 111 and the separate sections 112 are alternately provided in the longitudinal direction of the optical fiber cores 11. Each of the coupled sections 111 is formed such that a length L1 of each of the coupled sections 111 in the longitudinal direction of the optical fiber cores 11 is, for example, 5 mm to 50 mm. Each of the separate sections 112 is formed such that a length L2 of each of the separate sections 112 in the longitudinal direction of the optical fiber cores 11 is, for example, 20 mm to 100 mm.

As illustrated in FIG. 2, in the coupled sections 111, all adjacent optical fiber cores 11A to 11L are coupled by the coupling member 12. As illustrated in FIG. 3, in the separate sections 112, some adjacent optical fiber cores 11 are not coupled by the coupling member 12. Each of the separate sections 112 is formed, for example, by coupling all optical fiber cores 11 with the coupling member 12 and then cutting parts of the coupling member 12 with a rotary blade or the like. Alternatively, each of the separate sections 112 may be formed by coupling, with the coupling member 12, only the optical fiber cores 11 to be coupled.

It should be noted that the expression "some adjacent optical fiber cores 11 are not coupled by the coupling member 12 in the separate sections 112" used in the present specification means that some adjacent optical fiber cores 11 are not coupled to each other by the coupling member 12 in each of the separate sections 112, and at least two optical fiber cores 11 adjacent to each other are coupled to each other in the remaining optical fiber cores 11. In other words, the expression does not include a structure in which all optical fiber cores 11 adjacent to each other are not coupled in each of the separate sections 112.

In this example, twelve optical fiber cores 11 in each of the separate sections 112 are divided into three groups G1 to G3. The group G1 includes four optical fiber cores 11A to 11D. The group G2 includes four optical fiber cores 11E to 11H. The group G3 includes four optical fiber cores 11I to 11L. In each of the groups G1, G2, and G3, adjacent optical fiber cores 11 are coupled to each other by the coupling member 12 in a state of being in contact with each other. On the other hand, adjacent groups G1 to G3 are not coupled by the coupling member 12. Specifically, the optical fiber cores 11D of the group G1 and the optical fiber core 11E of the group G2 are not coupled. Similarly, the optical fiber core 11H of the group G2 and the optical fiber core 11I of the group G3 are not coupled. Adjacent optical fiber cores 11 in each of the groups G1, G2, and G3 may be coupled by another coupling member different from the coupling member 12.

As described above, since the optical fiber ribbon 10 is provided with the coupled sections 111 in which all of the plurality of the optical fiber cores 11 are coupled, the plurality of the optical fiber cores 11 is collectively handled. On the other hand, the separate sections 112 are provided in which some adjacent optical fiber cores 11 are not coupled to each other. This may widen a spacing between adjacent optical fiber cores 11 that are not coupled to each other, and thus increase a width in an arrangement direction of the entire optical fiber cores 11 that constitute the optical fiber ribbon 10. For example, when an existing fusion splicer having grooves with an arrangement pitch different from that of the optical fiber cores 11 is used to splice the optical fiber ribbon 10 to another optical fiber core, the width in the arrangement direction of the entire optical fiber cores 11 may be increased to match the arrangement pitch of the grooves of the existing fusion splicer.

With reference to FIGS. 5 to 8C, a fusion splicing of the optical fiber ribbon 10 to another optical fiber core using the existing fusion splicer 40 will be described. An example will be described below in which each of the optical fiber cores 11 has an outer diameter of 200 μm and an arrangement pitch of 200 μm, and a fusion splicer 40 has an arrangement pitch of V-grooves 41 of 250 μm.

Figure 5:
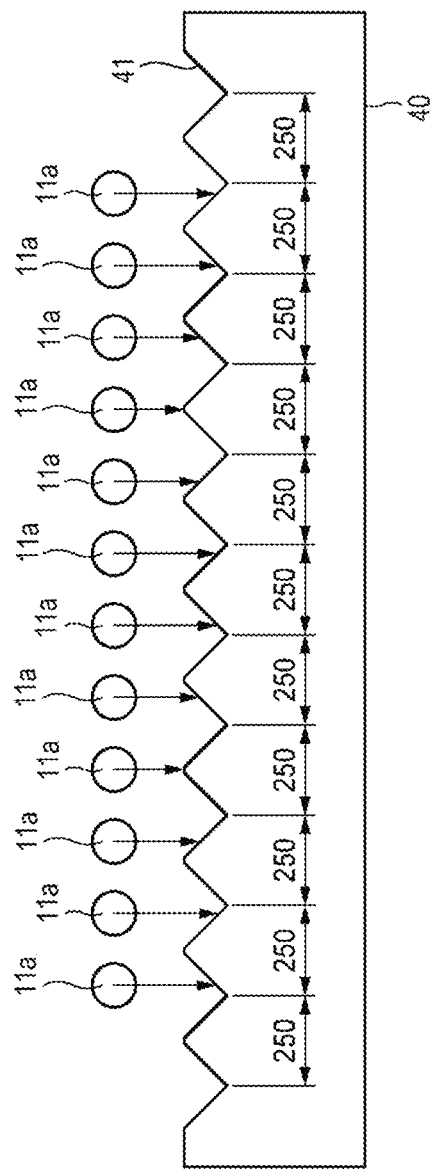
FIG. 5 is a diagram illustrating a fusion-splicing of an optical fiber ribbon to another optical fiber core using a fusion splicer.

As illustrated in FIG. 5, when the fusion splicing is performed, the optical fiber cores 11 of the optical fiber ribbon 10 is set in V-groove 41 of fusion splicer 40 in a state where coating resin 11b at tips of the optical fiber cores 11 is removed such that glass fibers 11a are exposed. When an arrangement pitch of the optical fiber cores 11 is 200 μm and an arrangement pitch of V-grooves 41 of fusion splicer 40 is 250 μm, some of glass fibers 11a are not disposed in corresponding V-grooves 41, and thus an arrangement pitch of glass fibers 11a may not be converted from 200 μm to 250 μm.

On the other hand, in the optical fiber ribbon 10 according to the present disclosure is convertible to have the arrangement pitch of glass fibers 11a from 200 μm to 250 μm by widening a spacing between adjacent groups G1 to G3 in the separate sections 112.

Figure 6:
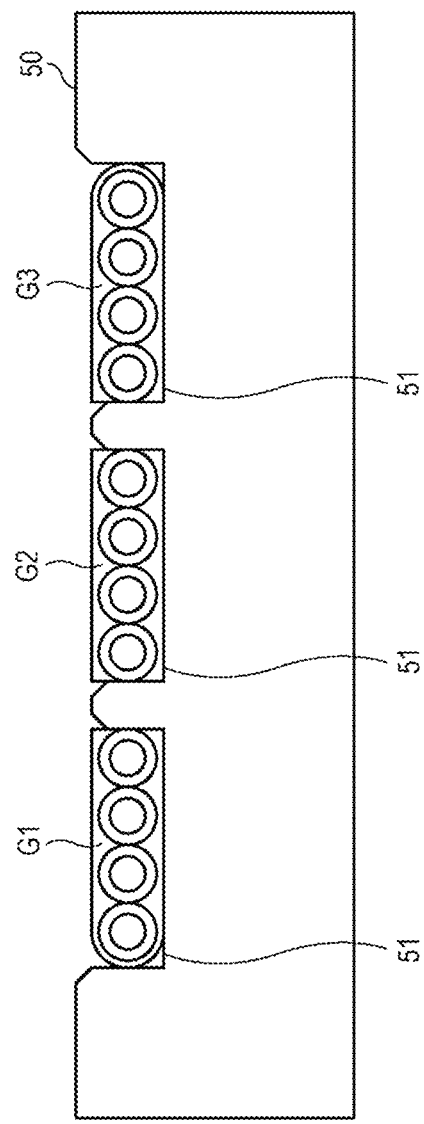
FIG. 6 is a diagram illustrating a fusion-splicing of an optical fiber ribbon to another optical fiber core using a fusion splicer.

Specifically, first, as illustrated in FIG. 6, a coupled section 111 at a tip of the optical fiber ribbon 10 is cut off, and a separate section 112 adjacent to the cut-off coupled section 111 is set in pitch conversion holder 50. Pitch conversion holder 50 is configured to convert an arrangement pitch of glass fibers 11a and is mounted on fusion splicer 40. Specifically, pitch conversion holder 50 has a plurality of recesses 51 that is configured to house each of the groups G1 to G3 of the optical fiber ribbon 10. The recesses 51 are formed at a predetermined interval.

Figure 7:
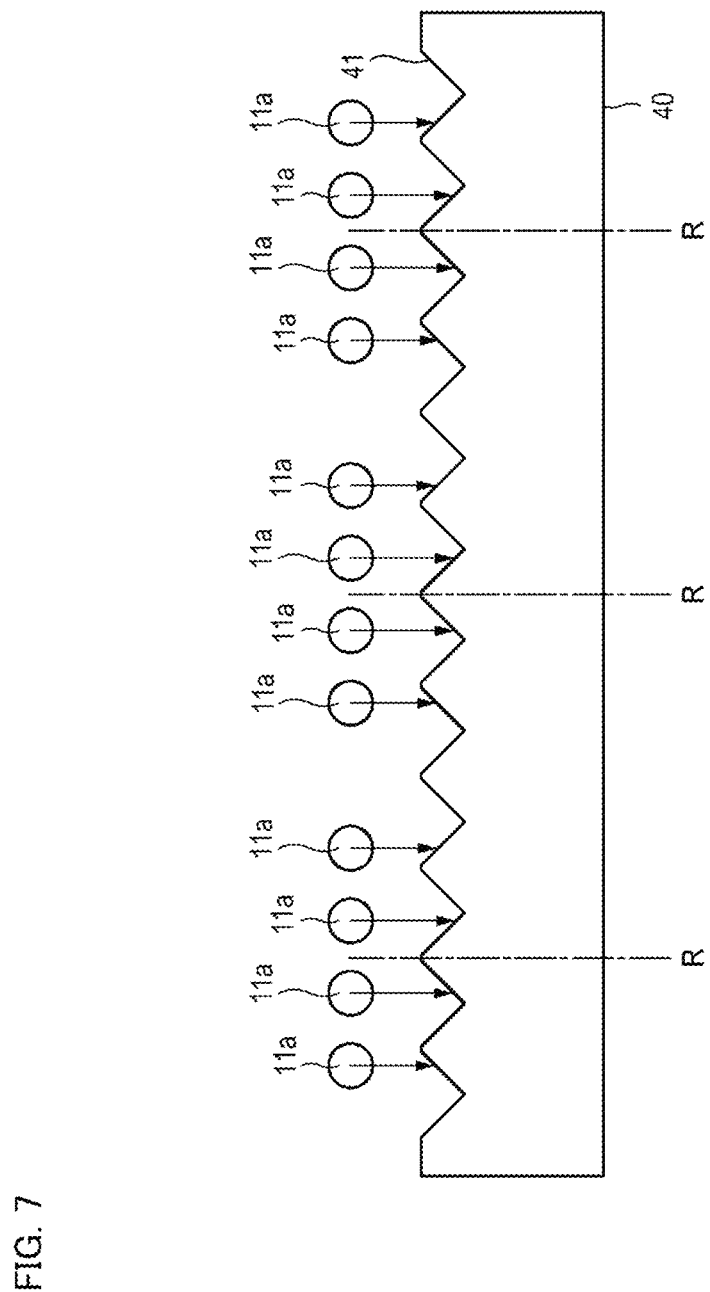
FIG. 7 is a diagram illustrating a fusion-splicing of an optical fiber ribbon to another optical fiber core using a fusion splicer.

As illustrated in FIG. 7, the interval of recesses 51 is set such that the center of an arrangement of glass fibers 11a of each of the groups G1 to G3 exposed at a tip of the separate section 112 matches a reference position R of V-grooves 41. Reference position R is a position of the center of an arrangement of V-grooves 41 corresponding to glass fibers 11a included in each of the groups G1 to G3 of the optical fiber ribbon 10. The groups G1 to G3 are arranged in parallel at intervals by being arranged in each of recesses 51.

Figure 8A:
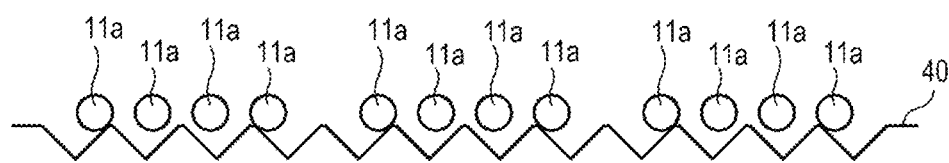
FIGS. 8A to 8C are diagrams illustrating a fusion-splicing of an optical fiber ribbon to another optical fiber core using a fusion splicer.
Figure 8B:
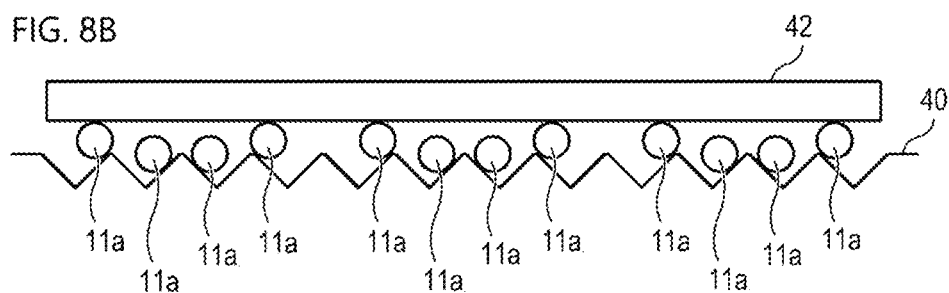
Figure 8C:
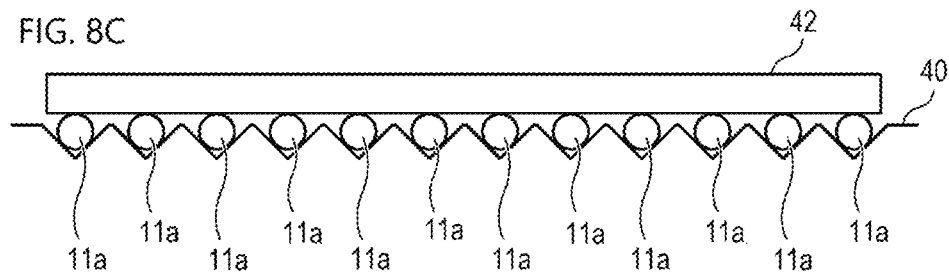

Subsequently, glass fibers 11a whose width in a direction of the entire arrangement is widened as illustrated in FIG. 8A are pressed toward V-grooves 41 by a lid 42 of fusion splicer 40 as illustrated in FIG. 8B. At this time, since a spacing between the group G1 and the group G2, and a spacing between the group G2 and the group G3 in the optical fiber ribbon 10 is widened, even when the arrangement pitch of glass fibers 11a of the optical fiber ribbon 10 is slightly shifted from the arrangement pitch of V-grooves 41 of fusion splicer 40, only one glass fiber 11a to be inserted into each of V-grooves 41 abuts against an inclined surface of each of V-grooves 41 of fusion splicer 40. Each of glass fibers 11a is guided along the inclined surface of a corresponding groove of V-grooves 41, so that one corresponding fiber of glass fibers 11a is placed in each of V-grooves 41 as illustrated in FIG. 8C.

In this way, by widening the width of the arrangement direction of the entire optical fiber cores 11, it is possible to adapt to the arrangement pitch of V-grooves 41 of the existing fusion splicer 40, and thus it is possible to improve connection workability while maintaining the ease of handling.

Further, in the present embodiment, since twelve optical fiber cores 11 are divided into three groups G1 to G3 in each of the separate sections 112, it is easy to adapt the optical fiber cores 11 constituting the optical fiber ribbon 10 to the arrangement pitch of V-grooves 41 of an existing pitch conversion holder 50 or an existing fusion splicer 40.

In addition, since each of the groups G1 to G3 of each of the separate sections 112 includes four optical fiber cores, a plurality of the optical fiber cores 11 is collectively handled for each of the groups G1 to G3. This improves connection workability of the optical fiber cores 11.

In addition, each of the coupled sections 111 is formed such that the length L1 of each of the coupled sections 111 in the longitudinal direction of the optical fiber cores 11 is 5 mm to 50 mm. When the length L1 of each of the coupled sections 111 in the longitudinal direction of the optical fiber cores 11 is 5 mm or more, even when the optical fiber ribbon 10 is shocked by vibration, the coupled sections 111 are less likely to be separated from the optical fiber cores 11. On the other hand, when the length L1 of each of the coupled sections 111 is 50 mm or less, for example, when the coupled sections 111 is cut off and a separate section 111 is set in pitch conversion holder 50, it is possible to suppress an occurrence of waste in which the coupled section 111 is cut long to be removed.

In addition, each of the separate sections 112 is formed such that the length L2 of each of the separate sections 112 in the longitudinal direction of the optical fiber cores 11 is 20 mm to 100 mm. When the length L2 of each of the separate sections 112 in the longitudinal direction of the optical fiber cores 11 is 20 mm or more, it is easy to set a separate section 112 in pitch conversion holder 50. On the other hand, when the length L2 of the separate sections 112 is 100 mm or less, it is easy to maintain an arrangement state without causing the optical fiber cores 11 to be largely separated from each other.

Although the present disclosure has been described in detail and with reference to specific embodiments, it is clear to those skilled in the art that various changes and modifications may be made without departing from the spirit and scope of the present disclosure. In addition, the number, positions, shapes, and the like of the constituent members described above are not limited to those in the embodiments described above, and may be changed to the number, positions, shapes, and the like suitable for implementing the present disclosure.

Figure 9:
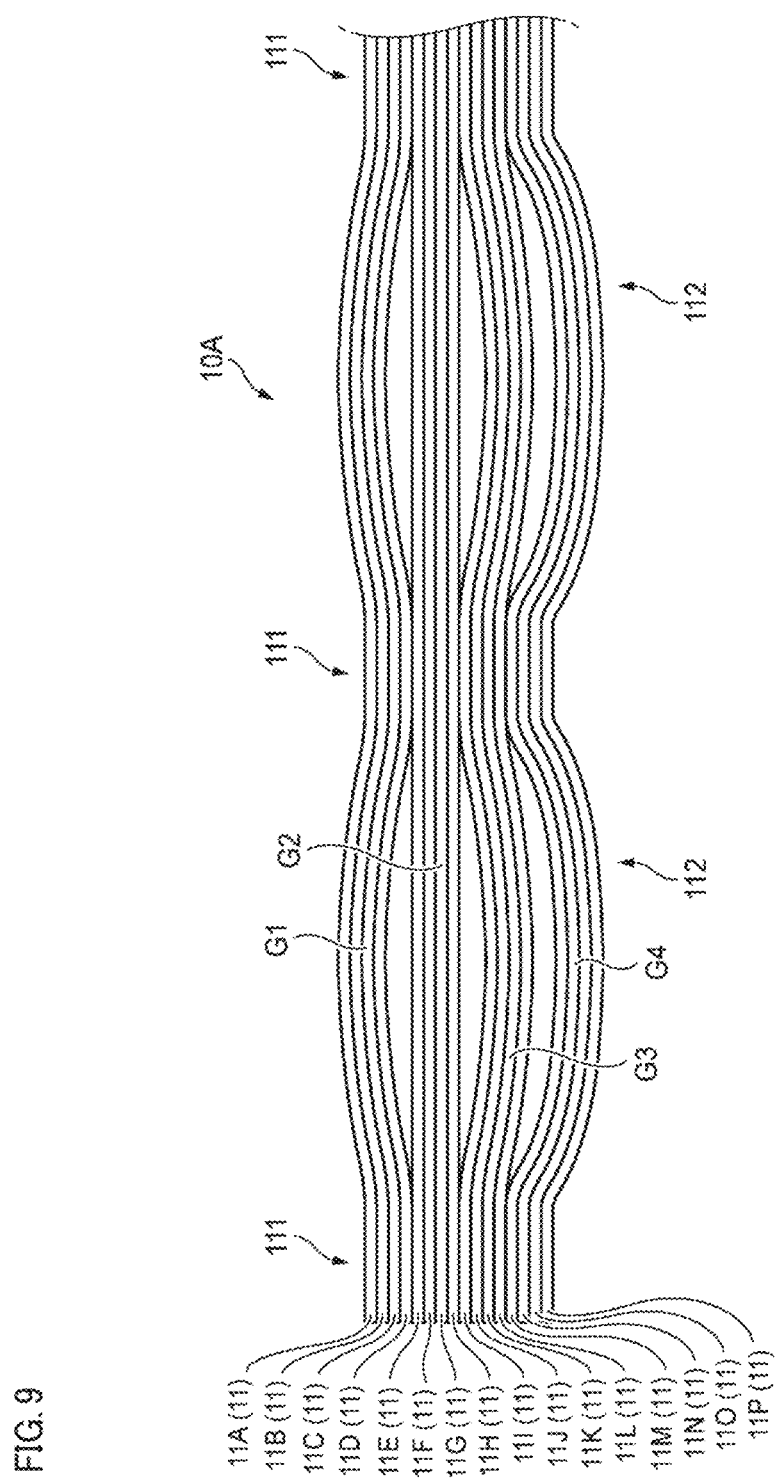
FIG. 9 is a diagram illustrating another example of a structure of an optical fiber ribbon.

In the above embodiment, the optical fiber ribbon 10 has twelve optical fiber cores 11. However, the number of the optical fiber cores 11 is not limited thereto. For example, as illustrated in FIG. 9, the optical fiber ribbon 10A may have 16 optical fiber cores 11A to 11P. In this example, 16 optical fiber cores 11 are divided into four groups G1 to G4 in each of the separate sections 112. Each of the groups G1 to G4 includes four optical fiber cores 11A to 11D, 11E to 11H, 11I to 11L, and 11M to 11P, respectively. When 16 optical fiber cores 11 are divided into four groups G1 to G4 as described above, it is easy to adapt the optical fiber cores 11 constituting the optical fiber ribbon 10A to the arrangement pitch of V-grooves 41 of the existing pitch conversion holder 50 or the existing fusion splicer 40.

In the above embodiment, four optical fiber cores are included in each of the groups G1 to G3 of the optical fiber ribbon 10. However, as long as each of the groups G1 to G3 includes at least two optical fiber cores 11, the number of the optical fiber cores 11 included in each of the groups G1 to G3 is not limited thereto. For example, as illustrated in FIG. 10, optical fiber core 11 of the optical fiber ribbon 10B is divided into four groups G1 to G4 each including two or four optical fiber cores 11 in each of the separate sections 112.

In this embodiment, the group G1 located at a first end E1 of the optical fiber ribbon 10 in the arrangement direction of the optical fiber cores 11 includes two optical fiber cores 11A and 11B, and the group G4 located at a second end E2 of the optical fiber ribbon 10 includes four optical fiber cores 11I to 11L. In other words, in each of the separate sections 112, the number of the optical fiber cores 11 coupled to an optical fiber core 11 located at the first end E1 of the optical fiber ribbon 10B differs from the number of the optical fiber cores 11 coupled to an optical fiber core 11 located at the second end E2 of the optical fiber ribbon 10B. According to this configuration, since the coupling states of the optical fiber cores 11 at both ends of the optical fiber ribbon 10B are different, each of the optical fiber cores 11 may be identified. In particular, even when each of the optical fiber cores 11 is not colored for identification, or even when each of the optical fiber cores 11 is colored for identification but too difficult to see, each of the optical fiber cores 11 may be identified based on an arrangement position of each of the optical fiber cores 11.

Similarly, in the optical fiber ribbon 10A illustrated in FIG. 9, the number of the optical fiber cores 11 included in each of the groups G1 to G4 of the optical fiber ribbon 10A is not limited thereto. For example, 16 optical fiber cores 11 of the optical fiber ribbon 10A may be divided into five groups each including two or four optical fiber cores 11. In this case, the optical fiber ribbon 10A may be configured such that the number of the optical fiber cores 11 coupled to an optical fiber core 11 located at a first end E1 of the optical fiber ribbon 10A differs from the number of the optical fiber cores 11 coupled to an optical fiber core 11 located at a second end E2 of the optical fiber ribbon 10A.

In the embodiment described above, each of the optical fiber cores 11 has an outer diameter D of 200 μm. However, each of the optical fiber cores 11 may also be configured to have an outer diameter D of less than 200 μm, for example. Even when an outer diameter D of each of the optical fiber cores 11 is less than 200 μm, the optical fiber cores 11 may be adapted to the arrangement pitch of V-grooves 41 of the existing fusion splicer 40 by widening a spacing between adjacent optical fiber cores 11 that are not coupled.

In the above embodiment, all optical fiber cores 11 in each of the separate sections 112 are divided into a plurality of groups. However, each of the separate sections 112 may include a single optical fiber core 11 that is not coupled to adjacent optical fiber cores 11, as long as each of the separate sections 112 has at least one group including at least two optical fiber cores 11.

In the embodiment described above, the coupling member 12 is formed so as to cover the periphery of the optical fiber cores 11 in the optical fiber ribbon 10. However, a structure in which at least one of an upper surface or a lower surface of each of the optical fiber cores 11 is covered with the coupling member 12 or a structure in which gaps between adjacent optical fiber cores 11 are filled with the coupling member 12 may be employed. Further, the coupling member 12 may be formed of a coating tape, an adhesive, or the like instead of the coating resin.

What is claimed is:

1. An optical fiber ribbon comprising:
   a plurality of optical fiber cores arranged in parallel in a direction orthogonal to a longitudinal direction of the optical fiber cores; and
   a coupling member configured to couple the plurality of optical fiber cores,
   wherein a plurality of coupled sections and a plurality of separate sections are alternately provided in the longitudinal direction, each of the plurality of the coupled sections being in a state in which all of the adjacent optical fiber cores are coupled by the coupling member, each of the plurality of separate sections being in a state in which at least two of the optical fiber cores adjacent to each other are not coupled by the coupling member,
   wherein the plurality of optical fiber cores are divided into three or more groups each including at least two optical fiber cores,
   wherein, in the three or more groups, the optical fiber cores adjacent to each other are coupled to each other in a state of being in contact with each other,
   wherein, in the coupled sections, adjacent groups of the three or more groups are coupled to each other,
   wherein, in the separate sections, adjacent groups of the three or more groups are not coupled to each other, and
   wherein at least one group of the three or more groups has four or more cores.

2. The optical fiber ribbon according to claim 1,
   wherein the plurality of optical fiber cores includes 12 optical fiber cores, and
   wherein, in the separate sections, the plurality of optical fiber cores is divided into three groups.

3. The optical fiber ribbon according to claim 1,
   wherein the plurality of optical fiber cores includes 16 optical fiber cores, and
   wherein, in the separate sections, the plurality of optical fiber cores is divided into four groups.

4. The optical fiber ribbon according to claim 1, wherein a length of each of the coupled sections in the longitudinal direction is 5 mm to 50 mm.

5. The optical fiber ribbon according to claim 1, wherein a length of each of the separate sections in the longitudinal direction is 20 mm to 100 mm.

6. The optical fiber ribbon according to claim 1, wherein an outer diameter of each of the optical fiber cores is 200 μm or less.

7. The optical fiber ribbon according to claim 1, wherein, in the separate sections, the number of optical fiber cores to which an optical fiber core located at a first end of the optical fiber ribbon in an arrangement direction of the optical fiber cores orthogonal to the longitudinal direction is coupled differs from the number of optical fiber cores to which an optical fiber core located at a second end of the optical fiber ribbon in the arrangement direction of the optical fiber cores is coupled.

8. An optical fiber ribbon comprising:
a plurality of optical fiber cores arranged in parallel in a direction orthogonal to a longitudinal direction of the optical fiber cores; and
a coupling member configured to couple the plurality of optical fiber cores,
wherein a plurality of coupled sections and a plurality of separate sections are alternately provided in the longitudinal direction, one of the plurality of the coupled sections being in a state in which all adjacent optical fiber cores of the plurality of optical fiber cores are coupled by the coupling member, one of the plurality of separate sections being in a state in which at least two of the optical fiber cores adjacent to each other are not coupled by the coupling member,
wherein the plurality of optical fiber cores are divided into three or more groups each including at least two optical fiber cores,
wherein, in the three or more groups, the optical fiber cores adjacent to each other are coupled to each other in a state of being in contact with each other,
wherein, in the coupled sections, adjacent groups of the three or more groups are coupled to each other,
wherein, in the separate sections, adjacent groups of the three or more groups are not coupled to each other, and
wherein at least one group of the three or more groups has four or more cores.

9. An optical fiber ribbon comprising:
a plurality of optical fiber cores arranged in parallel in a direction orthogonal to a longitudinal direction of the optical fiber cores; and
a coupling member configured to couple the optical fiber cores,
wherein a coupled section and a separate section are formed to be arranged in the longitudinal direction, the coupled section being in a state in which the optical fiber cores are coupled by the coupling member, the separate section being in a state in which at least two of the optical fiber cores adjacent to each other are not coupled by the coupling member,
wherein the plurality of optical fiber cores are divided into three or more groups each including at least two optical fiber cores,
wherein, in the three or more groups, the optical fiber cores adjacent to each other are coupled to each other in a state of being in contact with each other,
wherein, in the coupled section, adjacent groups of the three or more groups are coupled to each other,
wherein, in the separate section, adjacent groups of the three or more groups are not coupled to each other, and
wherein at least one group of the three or more groups has four or more cores.

* * * * *